United States Patent
Doud et al.

(10) Patent No.: US 11,136,829 B2
(45) Date of Patent: Oct. 5, 2021

(54) METALLIC RING FOR SEALING A DOWNHOLE ROTARY STEERING PISTON

(71) Applicant: Halliburton Energy Services, Inc., Houston, TX (US)

(72) Inventors: Brian Lee Doud, Klein, TX (US); Neelesh Deolalikar, Houston, TX (US); Wei Zhang, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 95 days.

(21) Appl. No.: 16/349,469

(22) PCT Filed: Jun. 19, 2018

(86) PCT No.: PCT/US2018/038336
§ 371 (c)(1),
(2) Date: May 13, 2019

(87) PCT Pub. No.: WO2019/245539
PCT Pub. Date: Dec. 26, 2019

(65) Prior Publication Data
US 2020/0263501 A1 Aug. 20, 2020

(51) Int. Cl.
*F16J 15/28* (2006.01)
*F16J 15/24* (2006.01)
*E21B 7/06* (2006.01)

(52) U.S. Cl.
CPC .............. *E21B 7/062* (2013.01); *F16J 15/28* (2013.01); *F16J 15/24* (2013.01)

(58) Field of Classification Search
CPC .... F16J 15/28; F16J 15/26; F16J 15/20; F16J 15/24; F16J 15/16; F16J 15/50;
(Continued)

(56) References Cited

U.S. PATENT DOCUMENTS 2,231,801 A * 2/1941 Cords ..................... F16J 9/20
277/447
2,417,884 A * 3/1947 Overstreet .............. F16J 9/20
277/460
(Continued)

FOREIGN PATENT DOCUMENTS

WO 2012/012624 A1 1/2012

OTHER PUBLICATIONS

International Search Report and Written Opinion issued in related PCT Application No. PCT/US2018/038336 dated Mar. 18, 2019, 14 pages.
(Continued)

*Primary Examiner* — Nathan Cumar
(74) *Attorney, Agent, or Firm* — Benjamin Ford; Baker Botts L.L.P.

(57) ABSTRACT

Rotary steerable drilling systems are subjected to harsh environments including high temperature and pressure. A metallic seal ring prevents or limits erosive wear by limiting the velocity of the fluid that traversers from the high pressure side of the metallic seal ring to the low pressure side of the metallic seal ring to a value that can be sustained by the material of the metallic seal ring. A metallic seal ring is capable of withstand the wear and tear of drilling mud or other fluids used for downhole drilling operations. A metallic seal ring includes a mating configuration that creates a seal as the metallic seal ring is contracted when or a tension is applied when disposed or positioned in the piston bore. The metallic seal ring maintains an adequate seal to protect the components of a pad assembly over the life or specified duration of a downhole drilling operation.

20 Claims, 6 Drawing Sheets

(58) Field of Classification Search
CPC ... F16J 15/52; E21B 7/062; E21B 7/004; E21B 7/06; E21B 7/067; E21B 7/068; E21B 7/061
USPC .......................................................... 277/406
See application file for complete search history.

(56) References Cited

U.S. PATENT DOCUMENTS

| | | | | |
|---|---|---|---|---|
| 5,971,085 | A * | 10/1999 | Colebrook | E21B 7/06 175/266 |
| 10,378,286 | B2 * | 8/2019 | Hough | E21B 10/42 |
| 10,626,674 | B2 * | 4/2020 | Spatz | E21B 10/26 |
| 2008/0142268 | A1 | 6/2008 | Downton et al. | |
| 2014/0110178 | A1 | 4/2014 | Savage et al. | |
| 2016/0298392 | A1 | 10/2016 | Gajji et al. | |

OTHER PUBLICATIONS

International Preliminary Report on Patentability issued in related PCT Application No. PCT/US2018/038336 dated Dec. 30, 2020, 10 pages.

\* cited by examiner

METALLIC RING FOR SEALING A DOWNHOLE ROTARY STEERING PISTON

CROSS-REFERENCE TO RELATED APPLICATION

The present application is a U.S. National Stage Application of International Application No. PCT/US2018/038336 filed Jun. 19, 2018, which is incorporated herein by reference in its entirety for all purposes.

TECHNICAL FIELD

This application relates generally to providing a seal for a piston. More specifically, the application relates to a metallic seal ring for sealing a downhole rotary steering piston.

BACKGROUND

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different phases, such as, for example, drilling a wellbore at a desired well site, cementing the well, treating the wellbore to optimize production of hydrocarbons, and producing and processing the hydrocarbons from the subterranean formation for downstream use.

A drilling operation may require directing a drilling assembly within a borehole that may extend great distances vertically, horizontally, or a combination. A drilling operation involves controlling a number of parameters, just one example of which is directional control. Accurate control of a drilling assembly increases efficiency of the operation by reducing costs and time associate with the drilling operation. A rotary steerable tool is one type of tool used in drilling operations to provide directional control of a drilling operation.

Downhole tools, such as a rotary steerable tool, are typically exposed to extreme operating conditions, such as high pressures and temperatures, a variety of chemicals, and abrasive or erosive fluids. The seals used in such downhole tools must endure these extreme operating conditions to protect the components of the tool. Generally, seals comprise elastomer which can have failures or reliability issues at the extreme operating conditions that a downhole tool must endure.

BRIEF DESCRIPTION OF THE DRAWINGS

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to providing a seal for a piston ring, and more specifically, to a metallic ring for sealing a downhole rotary steering piston of rotary steerable drilling system. A directional drilling technique can involve the use of a rotary steerable drilling system that controls an azimuthal direction and/or degree of deflection while the entire drill string is rotated continuously. Rotary steerable drilling systems typically involve the use of an actuation mechanism that helps the drill bit deviate from the current path using either a "point the bit" or "push the bit" mechanism. Rotary steerable drilling systems must endure extreme operating conditions. For example, as the rotary steerable drilling system is directed downhole any one or more components of the rotary steerable drilling system is exposed or subjected to several operating conditions including, but not limited to, any combination of high temperature, high pressure, abrasive, erosive or corrosive materials, and chemical compositions. For example, sealing the mud pressure that generates the force to steer a rotary steerable drilling system, where the mud is abrasive and the downhole temperature is greater than 150° Celsius requires not only a particular type of seal but also a seal that comprises certain materials that can withstand the extreme operating conditions.

A metallic seal ring may protect the operational components of the rotary steerable drilling system by preventing or limiting erosive wear by limiting the velocity of the fluid that traverses from the high pressure to the low pressure side of a sealing ring to a value that can be sustained for the material of the seal. For example, drilling mud has characteristics that make sealing of the rotary steerable drilling system challenging as the mud does not have ideal lubrication properties and the mud contains abrasive sand solids that cause abrasion and erosion wear. When the rotary steerable drilling system is powered by drilling mud, the seal is then operating within this drilling mud on both the high pressure and low pressure side of the seal. Thus, a main challenge in rotary steerable drilling system applications is developing a seal ring and mating counter-body that can resist abrasion and erosion wear but can still maintain an adequate seal over the life or a specified duration of a downhole drilling operation. Such a seal ring must address or adequately handle several modes of wear. For example, one mode of wear relates to body to body contact or two body abrasion where the seal ring abuts or contacts piston bore surfaces. This type of wear includes abrasive wear, galling, fretting wear and adhesive wear. Such wear can be reduced by using hard materials, dissimilar materials, and reducing friction. The seal ring may also be subjected to one or more other modes of wear, including but not limited to, three body abrasion that occurs between the sand particles and the seal ring and piston bore, adhesion wear between the seal ring and piston bore and surface fatigue of the ring and bore caused by high contact stress. A metallic seal ring may be used to provide such a seal ring for a rotary steerable drilling system, for example, as the metallic seal ring can endure the extreme operating conditions for the life of the downhole drilling operation.

The present disclosure also contemplates that a metallic ring may be used as a seal in other applications other than rotary steerable drilling systems. For example, a metallic seal ring as discussed herein may be used as a seal in automotive engine designs. An automotive engine has a seal that seals a gas and is lubricated with an oil. For the automotive engine, gas is present on the high preside and a lubricating oil is present on the low pressure side. The metallic seal ring discussed herein provides a seal that protects the piston assembly of the automotive engine. In contrast to the automotive application, a downhole application utilizing a rotary steerable drilling system experiences additional challenges including inferior lubrication and exposure to fluids that are erosive, abrasive or both.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

Figure 1:
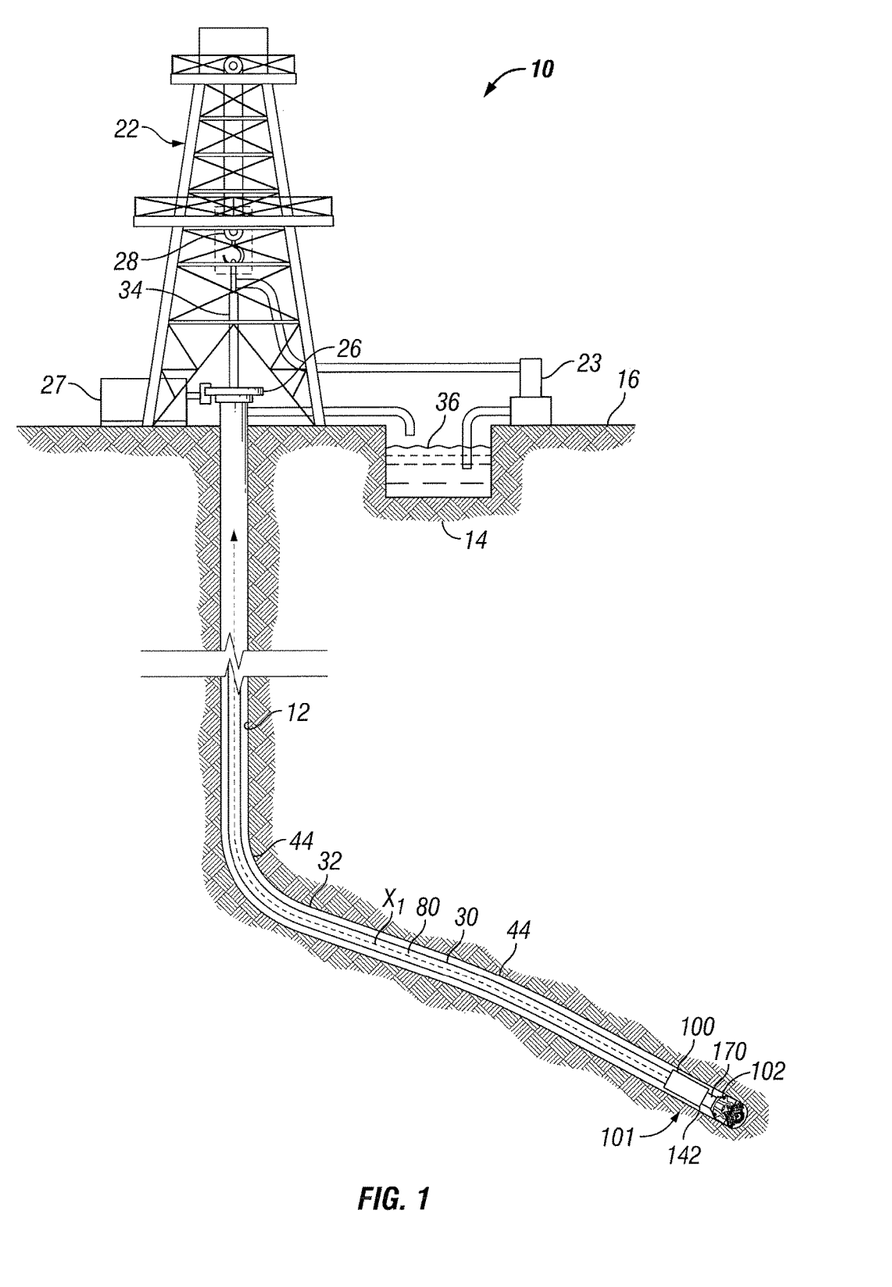
FIG. 1 is a diagram showing an illustrative drilling environment, according to one or more aspects of the present disclosure.

FIG. 1 is a diagram of an illustrative well system 10, according to one or more aspects of the present disclosure. In one or more embodiments, the well system 10 may be a hydrocarbon recovery, exploration, production or services environment. Well system 10 may comprise a drilling rig (or derrick) 22 at the surface 16 used to extend a tubing string 30 into and through one or more portions of a subterranean earthen formation 14. While FIG. 1 illustrates an on-shore well system 10, the present disclosure contemplates that the any one or embodiments may be implemented off-shore for a subsea drilling operation.

The tubing string 30 may be disposed, positioned or lowered in wellbore 12. Tubing string 30 may carry a drill bit 102 at a distal end which may be rotated to drill through the formation 14. A drilling fluid 32 may be injected, pumped or otherwise disposed within the wellbore 12 to facilitate the drilling of the wellbore 12. Drilling fluid 32 may be any type of downhole fluid used in drilling, for example, a mud-based fluid. Formation 14 may be a subterranean formation or a subsea formation. A bottom hole assembly (BHA) 101 interconnected in the tubing string 30 proximate the drill bit 102 may comprise one or more components and assemblies (not expressly illustrated in FIG. 1), such as, but not limited to, logging while drilling (LWD) equipment, measurement while drilling (MWD) equipment, a bent sub or housing, a mud motor, a near bit reamer, stabilizers, steering assemblies, and other downhole instruments, tools or assemblies. The BHA 101 may also comprise a rotary steerable drilling system 100 that is coupled to drill bit 102 and provides steering to the drill bit 102, mud-pulse telemetry 80 to support MWD/LWD activities, stabilizer actuation through fluid flow control, and a rotary steerable tool used for steering the wellbore 12 drilling of the drill bit 102. In one or more embodiments, wellbore 12 may be substantially vertical, substantially horizontal, or at any deviation. Steering of the drill bit 102 may be used to facilitate a deviation 44, and/or steering may be used to maintain a section in a wellbore 12 without deviations, since steering control may also be needed to prevent deviations in the wellbore 12. The rotary steerable drilling system 100 may also comprise a pad assembly 142 disposed or positioned at or about the drive shaft 170 or otherwise coupled to the draft shaft 170 above the drill bit 220, according to one or more aspects of the present disclosure.

At the surface location 16, the drilling rig 22 may be facilitate drilling the wellbore 12. The drilling rig 22 may include a turntable 26 that rotates the tubing string 30 and the drill bit 102 together about the longitudinal axis X1. The turntable 26 may be selectively driven by an engine 27, and selectively locked to prohibit rotation of the tubing string 30. A hoisting device 28 and swivel 34 may be used to manipulate the tubing string 30 into and out of the wellbore 12. To rotate the drill bit 102 with the tubing string 30, the turntable 26 can rotate the tubing string 30, and a drilling fluid 36 such as mud can be circulated downhole by mud pump 23. The drilling fluid 36 is illustrated as downhole drilling fluid 32 in FIG. 1. In one or more embodiments, the rotary steerable drilling system 100 comprises a pad assembly 142 may be expanded or extended to contact a wall of the wellbore 12 so that the rotary steerable drilling assembly 100 is steerable in a desired direction. For example, a force is applied using drilling mud pressure and fluid by creating a seal between a high pressure side, inner diameter of a bore of the pad assembly 142, where the drilling mud is entering and the outer diameter of the bore of the pad assembly 142 which has a lower pressure. The drilling mud or mud may be a calcium chloride brine mud, for example, which can be pumped through the tubing string 30 and passed through the rotary steerable drilling system 100. In one or more embodiments, the rotary steerable drilling system 100 may include a pad pusher and a rotary valve that selectively applies pressure to at least one output flow path to hydraulically actuate the pad pusher. Additionally, the mud can be pumped through a mud motor (not expressly illustrated in FIG. 1) in the BHA 101 to turn the drill bit 102 without having to rotate the tubing string 30 via the turntable 26.

Figure 2:
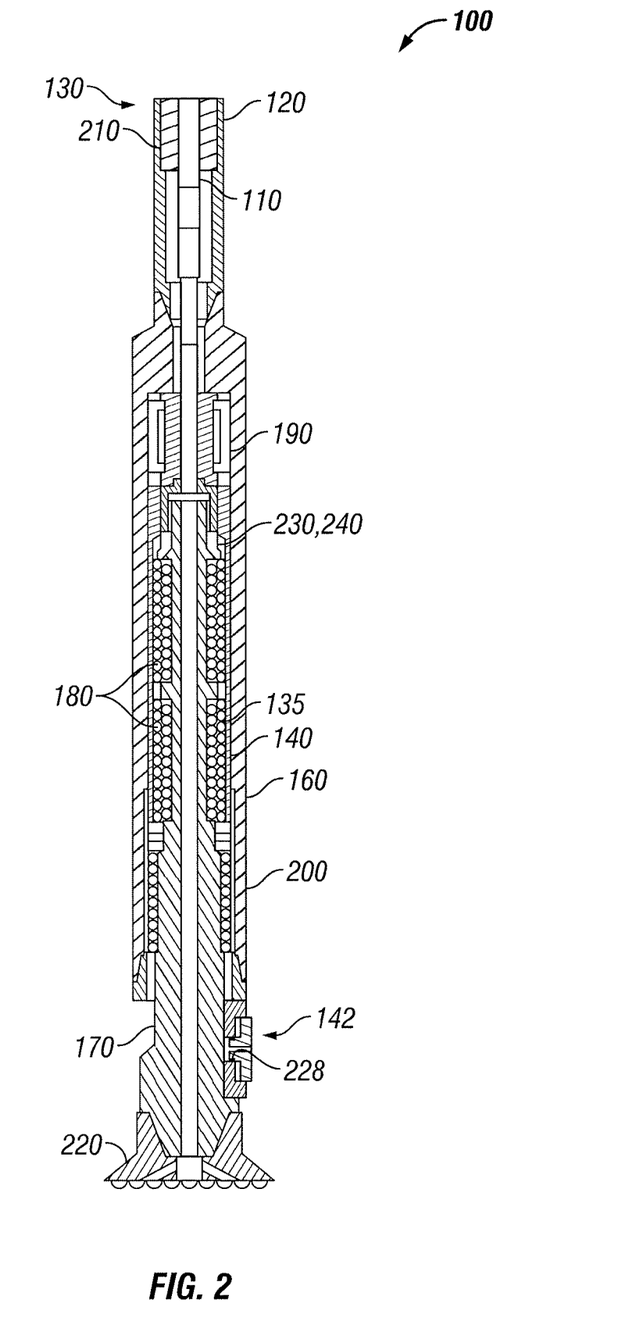
FIG. 2 is a diagram showing an illustrative rotary steerable drilling system, according to one or more aspects of the present disclosure.

FIG. 2 is a diagram illustrating a rotary steerable drilling system 100, according to one or more aspects of the present disclosure. The rotary steerable drilling system 100 may comprise an inner pipe 110, an outer pipe 120, a work string 130, an electric motor 135, stator windings 140, a motor housing 160, a drive shaft 170, drive shaft magnets 180, an electric motor controller 190, an electric motor controller housing 200, a flow diverter 210, a drill bit 220, and a high pressure flow restrictor 230. In certain embodiments, power, preferably direct current power, may be transmitted between the inner pipe 110 and the outer pipe 120 from the surface along the length of the work string 130. In certain embodiments, the inner pipe 110 may be considered the power hot conductor and the outer pipe 120 may be considered the ground. This may be important from a safety stand point to keep the outer pipe 120 as the ground, as it may be conductively connected to the drilling rig and it may be difficult to keep insulated in a drilling environment.

The inner pipe 110 and the outer pipe 120 may eccentric or concentric. In certain embodiments, the outer surface of the inner pipe 110 may be coated with an insulating material to prevent short circuiting of the inner pipe 110 through the mud or other contact points to the outer pipe 120. In one or more embodiments, the inner surface of the outer pipe 120 may be coated with an insulating material. Examples of insulating materials include dielectric materials. Suitable examples of dielectric materials include polyimide, a GORE™ high strength toughened fluoropolymer, nylon, TEFLON™, and ceramic coatings. In certain embodiments, only in areas sealed and protected from the drilling fluid is the bare metal of the inner pipe 110 exposed to make electrical connections along the length of the work string 130 to the next joint of the inner pipe. Such areas may be filled with air or a non-electrically conducting fluid like oil or a conductive fluid such as water based drilling fluids so long as there is not a path for the electric current to flow from the inner pipe to the outer pipe in a short circuit manner.

In one or more embodiments, stator windings 140 may be mounted in a pie wedge fashion within a shell carrier. In one or more embodiments, the shell carrier may be fixed within the motor housing 160 to prevent the carrier from rotating relative to the work string 130. The drive shaft 170 is coupled to the work string 130 and the drill bit 220 is coupled to the drive shaft 170.

In one or more embodiments, drive shaft magnets 180 may comprise fixed permanent magnets mounted on the drive shaft 170 in such a manner as to encourage reactive torque from the varying magnetic poles created by the stator windings 140. In certain embodiments, the electric motor 135 may comprise a six pole motor. Several variations in the number of poles and the decision on whether to couple the magnets to the drive shaft verses the housing exists as well as other forms of electric motors such as direct drive motors with a mechanical commutator drive winding arrangement and squirrel cage induction motors that do not use permanent magnets. Single phase motors are possible with the assistance of capacitors to create a pseudo second phase.

In certain embodiments, the electric motor controller 190 may be positioned above the stator windings 140 to control various aspects of the electric motor 135. The electric motor controller 190 can communicate in both directions with the surface through the two conductor path formed by the inner pipe 110 and the outer pipe 120 and through a feed through wire or wires that feed through the electric motor assembly to at least one module positioned below the motor. The at least one module may be downhole tooling, such as a LWD steering system, a MWD steering system, a rotary steerable tool, a hydraulic motor, an under reamer, a telemetry sub, or a drill bit.

In certain embodiments, the electric motor controller 190 may be housed inside a pressure controlled cavity to protect the electronics. The electric motor controller 190 electronics may be coated with a ceramic coating to allow for the cavity to be oil filled and pressure balanced with the annulus allowing for a thinner wall to house the electronics. Advantages of filling the cavity with oil and pressure balancing with the annulus are that the wall thickness to of the electronics cavity to be maintained in a much smaller thickness since it does not have to hold back the entire pressure of the fluid column leaving more space available for the electronics and providing for better heat conduction of heat generated by the electronics to keep it within operable limits.

In one or more embodiments, the stator windings 140 may be encapsulated in a ceramic, rubber, or epoxy like potting. This allows the encapsulated region additional short circuit protection that would normally be relegated to the typically peek coating found on the magnet wire which can then be exposed to mud which part of the mud circulates through this region to provide cooling for the windings and power electronics as well as lubricate the mud bearings and radial bearings along the drive shaft 170.

During operation of the pipe-in-pipe electric rotary steerable drilling system 100, mud may flow down annular spaces formed by the inner pipe 110 and the outer pipe 120. Mud and cuttings may be returned to the surface inside the inner pipe 110. However, near the top of the electric motor 135 this flow regime may change slightly. Flow diverters 210, which are electrically insulated from the outer drill pipe and preferably made of ceramic or metallic with a dielectric insulating coating on the outer surface, allow mud and cuttings from the annulus formed by the inner pipe 110 and the outer pipe 120 to enter the inner pipe while passing downward flowing mud through kidney shaped slots in the flow diverter 210. Below this point, downward flowing mud may be diverted into a center bore where it passes through the inner pipe 110 electrical connection to the electric motor 135 into the motor housing 160. At this point the downward flowing mud may take two separate paths. The first path is down the center bore of the drive shaft 170 and down to the drill bit 220 at the bottom of the work string 130 where it exits the drill bit 220 and begins its way back up the hole to the flow diverter inlet ports. The other path is through a high pressure flow restrictor 230 at the top of the drive shaft 170 then through the space between the outer portion of the rotor and the inner portion of the motor housing and out through the bottom radial bearing assembly just above the shaft bit connection on the bottom of the motor housing. The high pressure flow restrictor 230 may be designed to leak a certain amount of drilling fluid, for example, downhole drilling fluid 32 of FIG. 1, to flow through into the motor housing 160 to cool the stator windings 140 and to lubricate the radial and axial bearings of the electric motor 135. The high pressure flow restrictor 230 may also double as a radial bearing 240. In other embodiments, a separate radial bearing 240 may exist. The radial bearings 240 may comprise rubber marine bearings, PDC bearings or various hardened coatings like fused tungsten carbide.

The rotary steerable drilling system 100 may comprises a pad assembly 142. The pad assembly 142 may be extended or otherwise abut or contact the wellbore 12 to steer or guide the rotary steerable drilling system 100 in a desired, required or specified direction. Pad assembly 142 comprises one or more metallic seal rings 228 that provide a seal between the high pressure and low pressure sides of the rotary steerable drilling assembly 100 so that a steering force can be generated from flow of a drilling mud or other fluids that are circulated downhole. For example, the metallic seal rings 228 create a seal between a high pressure side, the inner diameter of the pad assembly 142 where mud is entering, from the low pressure side, the outer diameter of the pad assembly 142. The metallic seal ring 228 may comprise primarily or substantially a metallic material. The metallic seal ring 228 may be a compression piston ring. As drilling mud and other downhole fluids are typically abrasive as either containers fine particles of cuttings, for example, the metallic rings are abrasion and wear resistant to create the required seal.

Figure 3:
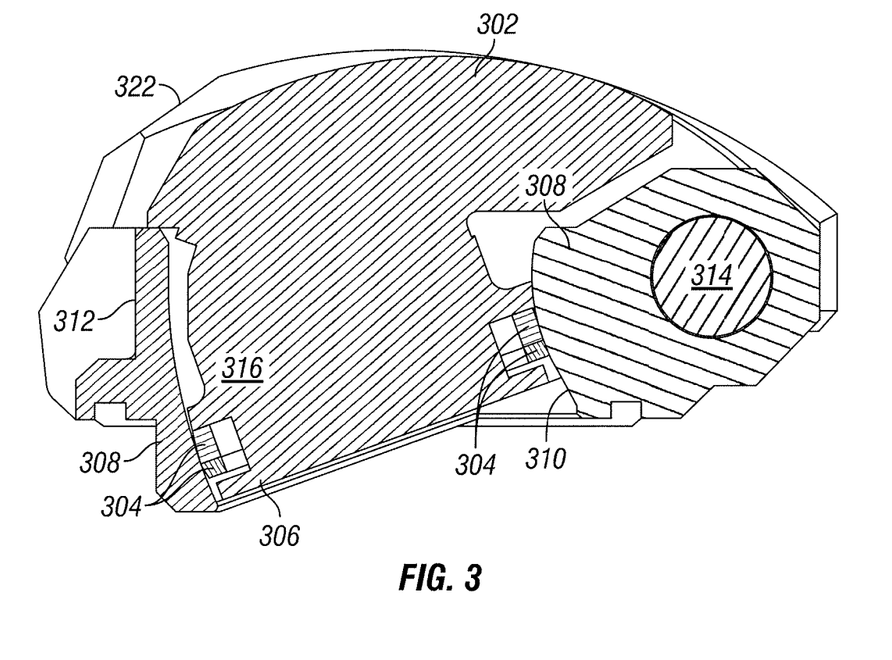
FIG. 3 is a diagram illustrating an example pad assembly for a rotary steerable drilling system, according to one or more aspects of the present disclosure.

FIG. 3 is a diagram illustrating an example pad assembly 300, for example, pad assembly 142 of FIG. 1 and FIG. 2, for a rotary steerable drilling system, for example, rotary steerable drilling system 100 of FIG. 1 and FIG. 2, according to one or more aspects of the present disclosure. Pad assembly 300 may comprise an outer housing 322, a pad 302, a piston bore 308, a hinge 314, a piston 316 and one or more metallic seal rings 304. In one or more embodiments, the one or more metallic seal rings 304 comprise a first metallic seal ring and a second metallic seal ring that abut each other and are circumferentially aligned with each other. Piston 316 is disposed or positioned with the piston bore 308 and contacts or couples to a piston gland 306. Piston bore 308 may comprise an inner diameter 310 and an outer diameter 312. Metallic seal rings 304 are similar to or the same as the metallic seal ring 228 of FIG. 2 and are disposed or positioned circumferentially within the piston bore 308 between the piston 316 and the piston gland 306. While FIG. 3 illustrates two metallic seal rings 304, in one or more embodiments, a single or a plurality of metallic seal rings 304 may be positioned or disposed in the piston bore 308. The hinge 314 allows the pad 302 of the pad assembly 300 to abut or contact a wall of the wellbore 12 to allow for steering of the rotary steerable drilling system 100. The hinge 314 constrains the pad 302, piston 316, piston gland 306 and seals 304 within the piston bore 308, where the piston bore 308 has an arc profile whose center is at the same geometric location as the center of the hinge 314, thereby aligning each of these parts within the piston bore 308.

Figure 4:
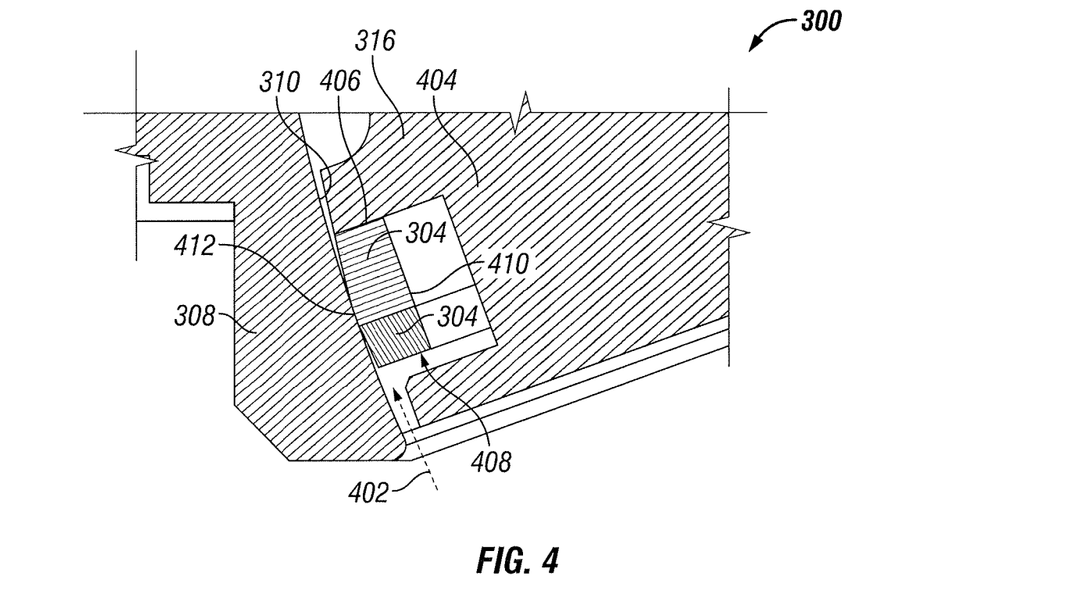
FIG. 4 is a diagram illustrating portions of an example pad assembly for a rotary steerable drilling system, according to one or more aspects of the present disclosure.

FIG. 4 is a diagram illustrating portions of an example pad assembly, for example, pad assembly 300 of FIG. 3, for a rotary steerable drilling system, for example, rotary steerable drilling system 100 of FIG. 1 and FIG. 2. During a drilling operation, to create a seal that limits the flow of fluid, such as drilling fluid 32 of FIG. 1, from a high pressure side of the piston bore 308 to low pressure side of the piston bore 308, the one or more metallic seal rings 304 make surface contact with the piston bore 308. In one or more embodiments, the one or more metallic seal rings 304 may also make surface contact with the piston 316. The seal is generated or created by a high pressure acting on a surface 408 of the metallic seal ring 304 and the inner diameter surface 410 of the one or more metallic seal rings 304. The pressure acting on surface 408 creates a seal between surface 406 and the piston 316 and the pressure acting on inner diameter surface 410 creates a seal between outer diameter surface 412 of the one or more metallic seal rings 304 and piston bore 308. In one or more embodiments a metal-to-metal contact of the one or more metallic seal rings 304 with the piston 316 and the piston bore 308 creates a seal to generate a differential pressure to create a steering force. For example, a fluid (such as a drilling fluid 32) may flow through the rotary steerable drilling system 100 as described above with respect to FIG. 2. The one or more metallic seal rings form a seal that prevents or limits the flow of fluid from a high pressure side of the one or more metallic seal rings 304 to a low pressure side of the one or more metallic seal rings 304 and seals off axial fluid flow 402 and radial fluid flow 404 from the one or more components of the pad assembly 300. For the one or more metallic seal rings 304 to expand such that an outer diameter 412 of the metallic seal ring contacts, abuts or otherwise presses against an inner diameter 310 of the piston bore 308, the metallic seal ring 304 may comprise a notch, split or gap as discussed below with respect to FIGS. 5A-5E. With the notch in the metallic seal ring 304, the initial outer diameter 414 of the metallic seal ring 304 can be made larger than the piston bore 308. A small notch is permissible if the velocity of the fluid is kept below a specified or predetermined limit of the material of the one or more metallic seal rings 304. The velocity can be kept sufficiently low by limiting the pressure differential across the one or more metallic seal rings 304. The notch may be eliminated or substantially eliminated by the metal-to-metal contact of the one or more metallic seal rings 304 in the axial direction (402) and the radial direction (404). The axial direction metal-metal contact seal may be created by a lap joint in a metallic seal ring 304 or by staggering the one or more metallic seal rings 304 such that the notch of the one or more metallic seal rings 304 do not overlap.

The notch, split or gap in a metallic seal rings 304 allows the outer diameter 312 of the metallic seal ring 304 to either expand or contract. Such a feature has several advantages. For example, allowing a metallic seal ring 304 to expand allows the metallic seal ring 304 to seal even if the inner diameter 310 of the piston bore 308 is manufactured too large, for example, at the upper end of a size tolerance. Additionally, if the inner diameter 310 of the piston bore 308 wears from abrasion and becomes larger and if the metallic seal ring 304 wears from abrasion and becomes smaller, allowing the metallic seal ring 304 to expand still allows the metallic seal ring 304 to seal. Another advantage of the notch, split or gap in the metallic seal ring 304 is that the notch, split or gap allows the metallic seal ring 304 to contract. A metallic seal ring 304 is likely to jam if the metallic seal ring 304 can contract when fluid that contains sand particles become lodged between the metallic seal ring 304 and the piston bore 308.

In one or more embodiments, the form, shape or geometry of the metallic seal ring 304 may be circular or round with an outer diameter and an inner diameter. In one or more embodiments, the surface of the metallic seal ring may be barrel shaped which allows for line contact with the piston bore 308 even if the metallic seal ring 304 cocks or tilts as illustrated in FIGS. 3 and 4. A barrel-shaped surface also is advantageous for curved piston bore 308 as such a design prevents frictional jamming the metallic seal ring 304. Another advantage of the barrel shape is that is can be conducive to creating a hydrodynamic lubrication film between the metallic seal ring 304 and the piston bore 308. This lubricating film between the metal seal and the piston bore 308 helps to reduce wear between components of the pad assembly 142. When the metallic seal ring 304 is installed in the piston bore 308, the metallic seal ring 304 will contract, thereby creating tension in the metallic seal ring 304. This tension creates an initial metal contact and seal between the metallic seal ring 304 and the piston bore 308. In one or more embodiments, the tension may also create a seal between the metallic seal ring 304 and the piston 316.

Figure 5A:
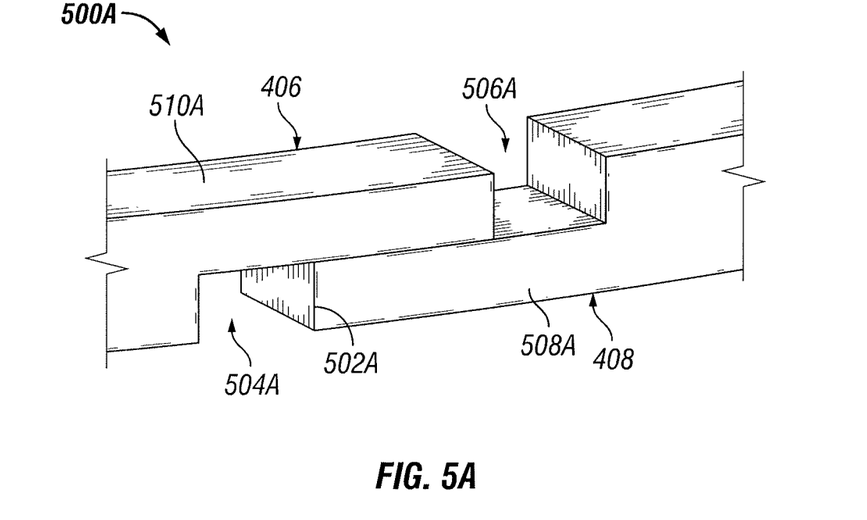
FIG. 5A is a diagram illustrating a partial view of a metallic seal ring, according to one or more aspects of the present disclosure.

FIGS. 5A-5E illustrate several joint designs for one or more metallic seal rings that create a seal in both the axial and radial direction. FIG. 5A is a diagram illustrating a partial view of a metallic seal ring 500A, according to one or more embodiments. Metallic seal ring 500A may be similar to or the same as metallic seal ring 300 of FIG. 3. Metallic seal ring 500A forms an axial metal-to metal seal when disposed or positioned in a piston bore, for example, piston bore 308 of FIG. 3. Metallic seal ring 500A comprises an upper lap joint 510A at a surface 406 and a lower lap joint 508A at a surface 408. The lower lap joint 508A overlaps with the upper lap joint 510A such that an upper notch 506A and a lower notch 504A in the space or area where the lower lap joint 508A and the upper lap joint 510A do not overlap. For example, lower lap joint 508A comprises an edge 502A that abuts the lower notch 504A but does not abut or contact a portion of the metallic seal ring 500A. Metallic seal ring 500A is a step-cut metallic seal ring and is used where two metallic seal rings per groove is not practical. The step cut metallic seal ring 500A is used to prevent a direct flow path between the piston 316 and the piston bore 308. In one or more embodiments, the metallic seal ring 500A does not comprise overlapping lower lap joint 508A and upper lap joint 510A, but rather the opposite sides of the ring are flat or sheared surfaces which form a shear cut. Each side of the flat or sheared surfaces would abut flush against each other when the metallic seal ring 500A is contracted or tension is applied.

Figure 5B:
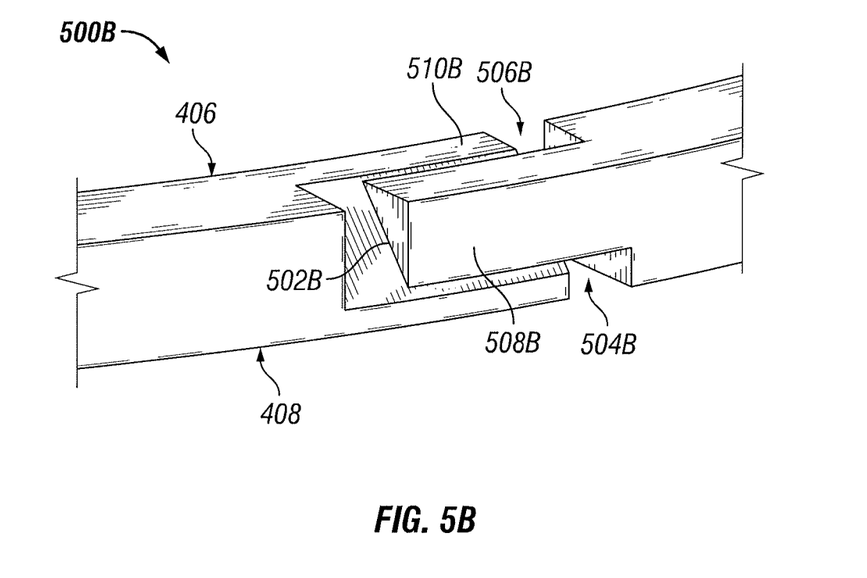
FIG. 5B is a diagram illustrating a partial view of a metallic seal ring, according to one or more aspects of the present disclosure.

FIG. 5B is a diagram illustrating a partial view of a metallic seal ring 500B, according to one or more aspects of the present invention. Metallic seal ring 500B may be similar to or the same as metallic seal ring 300 of FIG. 3. Metallic seal ring 500B forms an axial and radial metal-to-metal seal. Metallic seal ring 500B comprises an upper wedge lap joint 510B at a surface 406 and a lower wedge lap joint 508B at a surface 408. The lower wedge joint 508B overlaps with the upper wedge joint 510B such that an upper notch 506B and a lower notch 504B in the space or area where the lower wedge joint 508B and the upper wedge joint 510B do not completely overlap. Lower wedge joint 508A comprises a mitered or beveled edge 502B. In one or more embodiments, edge 502B abuts the lower notch 504B but does not abut or contact a portion of the metallic seal ring 500B. In one or more embodiments, a portion of edge 502B may contact or abut a portion of the metallic seal ring 500B. Metallic seal ring 500B provides tighter leakage control than other single ring metallic seal rings. Generally, this type of miter-step seal ring is used on larger diameter seal rings when using one ring per groove.

Figure 5C:
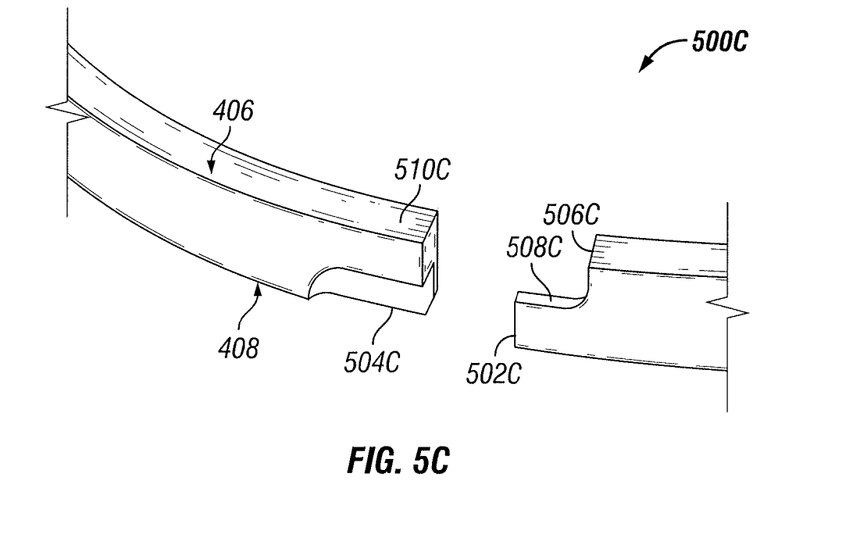
FIG. 5C is a diagram illustrating a partial view of a metallic seal ring, according to one or more aspects of the present disclosure.

FIG. 5C is a diagram illustrating a partial view of a metallic seal ring 500C, according to one or more aspects of the present invention. Metallic seal ring 500C may be similar to or the same as metallic seal ring 300 of FIG. 3. Metallic seal ring 500C forms an axial and radial metal-to-metal seal, for example, a Permaseal™ from Grover Corporation. Metallic seal ring 500C comprises an inner inset lap joint 510C between surface 406 and surface 408 and an outer inset lap joint 508C. An outer edge 502C of outer inset lap joint 508B may abut lower notch 504C such that outer inset lap joint 510C abuts an upper notch 506C. In one or more embodiments, any one or more of outer inset lap joint 508B and inner inset lap joint 508C abuts or contacts a portion of the metallic ring 500C. Inner inset lap joint 508C may comprise a mitered or beveled edge 502C. Mitered or beveled edge 502C may expand into lower notch 504C to contact the inset lap joint 510C or the other side of the metallic seal ring 500C when the metallic seal ring 500C is contracted or tension is applied to the metallic seal ring 500C.

Figure 5D:
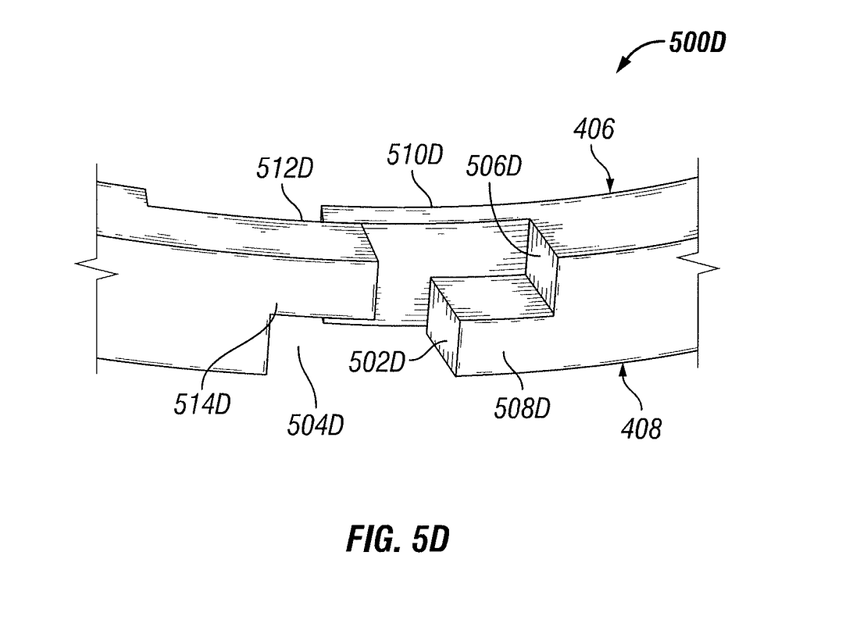
FIG. 5D is a diagram illustrating a partial view of a metallic seal ring, according to one or more aspects of the present disclosure.

FIG. 5D is a diagram illustrating a partial view of a metallic seal ring 500D, according to one or more aspects of the present invention. Metallic seal ring 500D may be similar to or the same as metallic seal ring 300 of FIG. 3. Metallic seal ring 500D forms an axial and radial metal-to-metal seal. Metallic seal ring 500D comprises an inner joint 510D at a surface 406 and a lower outer joint 508D at a surface 408 at one end of the metallic seal ring 500D and an upper outer joint 514D that comprises an inner notch 512D. The lower outer joint 508D overlaps with top outer joint 514D such that an upper notch 506D and a lower notch 504D in the space or area where the lower outer joint 508D and the upper outer joint 514D do not completely overlap. Lower outer joint 508D may overlap or abut with a portion of inner joint MOD. Upper outer joint 514D may abut, contact or overlap lower outer joint 508D to form lower notch 504D and upper notch 506D. Inner joint 510D may overlap abut or contact upper outer joint 514D within upper notch 506D. Lower outer joint 508D comprises a flat, mitered or beveled edge 502D. In one or more embodiments, edge 502D abuts the lower notch 504D but does not abut or contact a portion of the metallic seal ring 500B. In one or more embodiments, a portion of edge 502D may contact or abut a portion of the metallic seal ring 500D. While a gap is illustrated in FIG. 5D with inner notch 512D, in one or more embodiments, when the metallic seal ring 500D is contracted or tension is applied to the metallic seal ring 500D, the upper outer joint 514D and inner joint 510D overlap such that the space or area of inner notch 512D and the upper notch 506D is shortened or eliminated to form a seal.

Figure 5E:
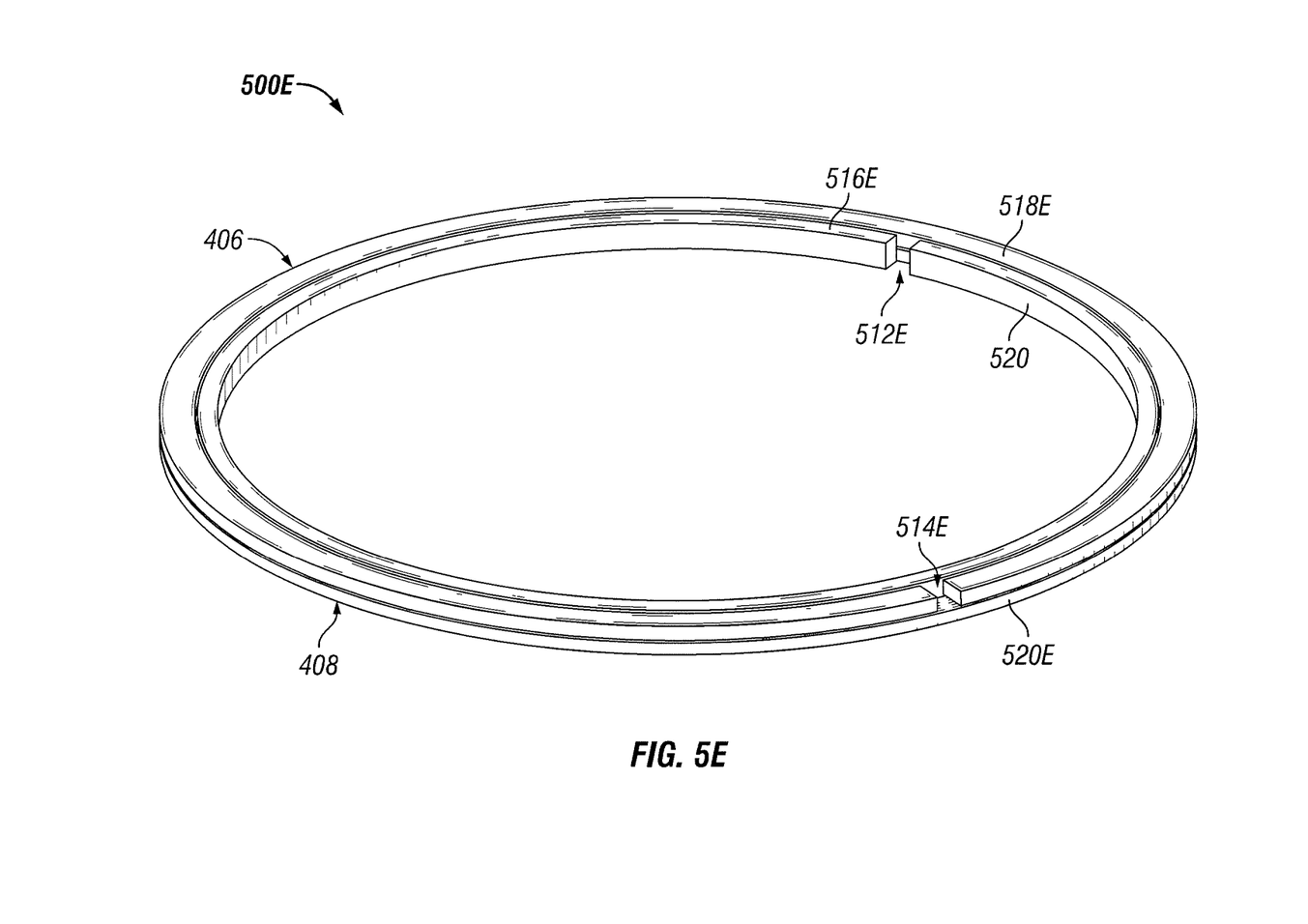
FIG. 5E is a diagram illustrating a partial view of a metallic seal ring, according to one or more aspects of the present disclosure.

FIG. 5E is a diagram illustrating a partial view of a metallic seal ring 500E, according to one or more aspects of the present invention. Metallic seal ring 500E may be similar to or the same as metallic seal ring 300 of FIG. 3. Metallic seal ring 500E comprises an outer upper metallic seal ring 518E, an outer lower metallic seal ring 520E and an inner metallic seal ring 516E to form a triple ring. The inner metallic seal ring 516E is disposed within or is enclosed by the outer lower metallic seal ring 520E and the outer upper metallic seal ring 518E. In one or more embodiments, no through gaps exist in metallic seal ring 500E as each gap in each ring abuts or contacts a portion of another ring. The metallic seal ring 500E provides axial and radial sealing. Any one or more of outer upper metallic seal ring 518E, outer lower metallic seal ring 520E and inner metallic seal ring 516E may comprise any one or more of the metallic seal rings illustrated in FIGS. 5A-5D or any other seal ring.

In one or more embodiments, a metallic seal ring as discussed above, may comprise one or more materials, coatings or both that address or are able to endure one or more modes of wear. In one or more embodiments, a metallic seal ring may comprise a substrate material that has a hardness of at or about 60 HRC (Rockwell Hardness measured on the C scale). Such a hard substrate prevents surface fatigue and provides a stiff foundation for hard, thin coatings. Such a hard substrate is particularly useful for three body abrasion where the sand particles can impart a high Hertzian stress in to the substrate materials. In one or more embodiments, the metallic seal ring may comprise a substrate material that is surface hardened by diffusion processes such as Nitriding or Boriding. This type of hard substrate prevents surface fatigue and provides a stiff foundation for hard, thin coatings. In one or more embodiments, the metallic seal ring may comprise a high velocity oxygen fuel (HVOF) coating with tungsten carbide (WC) particles that provides a hard and wear resistant surface. In one or more embodiments, the metallic seal ring may comprise a physical vapor deposition (PVD) coating that provides a hard and wear resistant surface. In one or more embodiment, a metallic seal ring may comprise a diamond-like carbon coating that provides a hard, wear resistant surface, and additionally has a low coefficient of friction. In one or more embodiments, the metallic seal ring may comprise a WC chemical vapor deposition (CVD) coating, for example, on the order of 50 microns thick. The thicker the WC CVD coating the potential for a longer life of the metallic seal ring. In one or more embodiments, the metallic seal ring may comprise a CVD coating similar to a PVD coating except that the thickness can be increased. In one or more embodiments, the metallic seal ring may comprise one or more chrome coatings. In one or more embodiments, the metallic seal ring may comprise any one or more coatings, one or more materials or any combination thereof.

The hard coatings on the metallic seal ring also serve to enable crushing of sand particles that may become lodged between the metallic seal ring 304 and the piston bore 308. If the coating is harder than the sand particles and the substrate is stiff enough, the sand particles may be crushed which prevents jamming of the metallic seal ring 304.

While hydrocarbon drilling is discussed herein, various embodiments of the disclosure may be used in many other applications. For example, one or more embodiments may be used in drilling of mineral exploration, environmental investigation, natural gas extraction, underground installation, mining operations, water wells, geothermal wells, automotive engines or any other environment where a seal must be used to protect one or more components from the environment.

In one or more embodiments a pad assembly comprises a piston, wherein the piston is disposed in a piston bore and a metallic seal ring disposed circumferentially within the piston bore, wherein the metallic seal ring creates a seal between the metallic seal ring and the piston bore. In one or more embodiments, the metallic seal ring makes surface contact with the piston bore to limit flow of a fluid from a high pressure side of the piston bore to a low pressure side of the piston bore. In one or more embodiments, the metallic seal ring comprises a first metallic seal ring circumferentially aligned with a second metallic seal ring. In one or more embodiments, the metallic seal ring comprises an inner metallic seal ring, an outer upper metallic seal ring and an outer lower metallic seal ring and wherein the inner metallic seal ring is disposed within the outer upper metallic seal ring and an outer lower metallic seal ring. In one or more embodiments, the metallic seal ring comprises a barrel-shaped outer surface. In one or more embodiments, the metallic seal ring metal-to-metal contacts with the piston and the piston bore. In one or more embodiments, the metallic seal ring comprises a notch that allows the metallic seal ring to expand and contract.

In one or more embodiments, a rotary steerable drilling system comprises a work string coupled to a drive shaft, a drill bit coupled to the drive shaft, a pad assembly coupled to the drive shaft above the drill bit and a metallic seal ring disposed circumferentially within a bore of the pad assembly, wherein the metallic seal ring creates a seal between the metallic seal ring and the piston bore. In one or more embodiments, the metallic seal ring makes surface contact with the bore to limit flow of fluid from a high pressure side of the bore to a low pressure side of the bore. In one or more embodiments, the metallic seal ring comprises a first metallic seal ring circumferentially aligned with a second metallic seal ring. In one or more embodiments, the metallic seal ring comprises an inner metallic seal ring, an outer upper metallic seal ring and an outer lower metallic seal ring and wherein the inner metallic seal ring is disposed within the outer upper metallic seal ring and an outer lower metallic seal ring. In one or more embodiments, the metallic seal ring comprises a barrel-shaped outer surface. In one or more embodiments, the metallic seal ring metal-to-metal contacts with a piston of the pad assembly and the bore. In one or more embodiments, the metallic seal ring comprises a notch that allows the magnetic seal ring to expand and contract.

In one or more embodiments, a method of drilling a wellbore in a formation comprises disposing a rotary steerable drilling system in the wellbore, wherein a drill bit is coupled to the rotary steerable drilling system, steering the rotary steerable drilling system, wherein steering the rotary steerable drilling system comprises contacting a wall of the wellbore with a pad assembly, wherein the pad assembly comprises a metallic seal ring disposed in a piston bore of the pad assembly and limiting a velocity of a fluid that traverses from a high pressure side of the metallic seal ring to a low pressure side of the metallic seal ring. In one or more embodiments, the limiting the velocity of the fluid comprises limiting the velocity of the fluid to a predetermined limit. In one or more embodiments, the method further comprises contacting the piston bore with the metallic seal ring to create a seal and limiting, by the seal, flow of a fluid from an axial direction and radial direction. In one or more embodiments, the method further comprises contacting at least one of a piston and a piston bore of the pad assembly with the metallic seal ring to create a seal. In one or more embodiments, the metallic seal ring comprises two or more overlapping metallic seal rings, wherein the overlapping metallic seal rings limit flow of a fluid. In one or more embodiments, the metallic seal ring comprises a first metallic seal ring circumferentially aligned with a second metallic seal ring.

What is claimed is:

1. A pad assembly, comprising:
    a piston disposed in a piston bore; and
    a metallic seal ring disposed circumferentially within the piston bore, wherein the metallic seal ring creates a seal between the metallic seal ring and the piston bore, wherein the metallic seal ring comprises an inner metallic seal ring, an outer upper metallic seal ring and an outer lower metallic seal ring, and wherein the inner metallic seal ring is disposed within the outer upper metallic seal ring and the outer lower metallic seal ring.

2. The pad assembly of claim 1, wherein the metallic seal ring makes surface contact with the piston bore to limit flow of a fluid from a high pressure side of the piston bore to a low pressure side of the piston bore.

3. The pad assembly of claim 1, wherein the metallic seal ring makes metal-to-metal contacts with the piston and the piston bore.

4. The pad assembly of claim 1, wherein the metallic seal ring comprises a notch that allows the metallic seal ring to expand and contract.

5. The pad assembly of claim 1, wherein the metallic seal ring comprises an upper lap joint and a lower lap joint, wherein the upper lap joint overlaps a portion of the lower lap joint.

6. The pad assembly of claim 5, wherein the metallic seal ring comprises an upper notch and a lower notch in a space where the lower lap joint and the upper lap joint do not overlap.

7. The pad assembly of claim 1, wherein the outer upper metallic seal ring is circumferentially aligned with the outer lower metallic seal ring, wherein the outer upper metallic seal ring is disposed adjacent to and directly contacts the outer lower metallic seal ring.

8. A rotary steerable drilling system, comprising:
a work string coupled to a drive shaft;
a drill bit coupled to the drive shaft;
a pad assembly coupled to the drive shaft above the drill bit; and
a metallic seal ring disposed circumferentially within a bore of the pad assembly, wherein the metallic seal ring creates a seal between the metallic seal ring and a piston bore, wherein the metallic seal ring comprises an inner metallic seal ring, an outer upper metallic seal ring and an outer lower metallic seal ring, and wherein the inner metallic seal ring is disposed within the outer upper metallic seal ring and the outer lower metallic seal ring.

9. The rotary steerable drilling system of claim 8, wherein the metallic seal ring makes surface contact with the bore to limit flow of fluid from a high pressure side of the bore to a low pressure side of the bore.

10. The rotary steerable drilling system of claim 8, wherein the metallic seal ring makes metal-to-metal contacts with a piston of the pad assembly and the bore.

11. The rotary steerable drilling system of claim 8, wherein the metallic seal ring comprises a notch that allows the magnetic seal ring to expand and contract.

12. The rotary steerable drilling system of claim 8, wherein the metallic seal ring comprises an upper lap joint and a lower lap joint, wherein the upper lap joint overlaps a portion of the lower lap joint.

13. The rotary steerable drilling system of claim 12, wherein the metallic seal ring comprises an upper notch and a lower notch in a space where the lower lap joint and the upper lap joint do not overlap.

14. The rotary steerable drilling system of claim 8, wherein the outer upper metallic seal ring is circumferentially aligned with the outer lower metallic seal ring, wherein the outer upper metallic seal ring is disposed adjacent to and directly contacts the outer lower metallic seal ring.

15. A method of drilling a wellbore in a formation, comprising:
disposing a rotary steerable drilling system in the wellbore, wherein a drill bit is coupled to the rotary steerable drilling system;
steering the rotary steerable drilling system;
wherein steering the rotary steerable drilling system comprises:
contacting a wall of the wellbore with a pad assembly, wherein the pad assembly comprises a metallic seal ring disposed in a piston bore of the pad assembly, wherein the metallic seal ring comprises an inner metallic seal ring, an outer upper metallic seal ring and an outer lower metallic seal ring, and wherein the inner metallic seal ring is disposed within the outer upper metallic seal ring and the outer lower metallic seal ring; and
limiting a velocity of a fluid that traverses from a high pressure side of the metallic seal ring to a low pressure side of the metallic seal ring.

16. The method of claim 15, wherein limiting the velocity of the fluid comprises limiting the velocity of the fluid to a predetermined limit.

17. The method of claim 15, further comprising:
contacting the piston bore with the metallic seal ring to create a seal; and
limiting, by the seal, flow of a fluid from an axial direction and radial direction.

18. The method of claim 15, further comprising contacting at least one of a piston and the piston bore of the pad assembly with the metallic seal ring to create a seal.

19. The method of claim 15, wherein the metallic seal ring comprises two or more overlapping metallic seal rings, wherein the overlapping metallic seal rings limit flow of a fluid.

20. The method of claim 15, wherein the metallic seal ring comprises:
an upper lap joint and a lower lap joint, wherein the upper lap joint overlaps a portion of the lower lap joint; and
an upper notch and a lower notch in a space where the lower lap joint and the upper lap joint do not overlap.

* * * * *